United States Patent
Ohmori et al.

(10) Patent No.: US 11,843,138 B2
(45) Date of Patent: Dec. 12, 2023

(54) METAL SEPARATOR AND FUEL CELL STACK

(71) Applicant: HONDA MOTOR CO., LTD., Tokyo (JP)

(72) Inventors: Suguru Ohmori, Wako (JP); Takuro Okubo, Wako (JP); Satoshi Oyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 174 days.

(21) Appl. No.: 17/360,110

(22) Filed: Jun. 28, 2021

(65) Prior Publication Data

US 2021/0408559 A1   Dec. 30, 2021

(30) Foreign Application Priority Data

Jun. 30, 2020   (JP) .................. 2020-112919

(51) Int. Cl.
| | |
|---|---|
| H01M 8/0267 | (2016.01) |
| H01M 8/0206 | (2016.01) |
| H01M 8/0273 | (2016.01) |
| H01M 8/04089 | (2016.01) |
| H01M 8/026 | (2016.01) |
| H01M 8/04858 | (2016.01) |
| H01M 8/248 | (2016.01) |

(52) U.S. Cl.
CPC ....... *H01M 8/0267* (2013.01); *H01M 8/0206* (2013.01); *H01M 8/026* (2013.01); *H01M 8/0273* (2013.01); *H01M 8/04089* (2013.01); *H01M 8/0494* (2013.01); *H01M 8/248* (2013.01)

(58) Field of Classification Search
None
See application file for complete search history.

(56) References Cited

U.S. PATENT DOCUMENTS

| | | |
|---|---|---|
| 7,977,003 B2 | 7/2011 | Nagoshi et al. |
| 10,741,861 B2 | 8/2020 | Ishida et al. |
| 2019/0131633 A1 | 5/2019 | Ishida et al. |

(Continued)

FOREIGN PATENT DOCUMENTS

| | | |
|---|---|---|
| CN | 109713344 A | 5/2019 |
| CN | 109962257 A | 7/2019 |

(Continued)

OTHER PUBLICATIONS

Office Action dated Mar. 1, 2022 issued over the corresponding Japanese Patent Application No. 2020-112919 with the English translation thereof.

(Continued)

*Primary Examiner* — Alix E Eggerding
(74) *Attorney, Agent, or Firm* — Carrier, Shende & Associates P.C.; Joseph P. Carrier; Jeffrey T. Gedeon

(57) ABSTRACT

A first outer peripheral seal in a first metal separator of a fuel cell stack includes a first peripheral metal bead. A first bypass stopper is provided in a space between a first end ridge and a first outer peripheral seal. The first bypass stopper prevents bypassing of an oxygen-containing gas by blocking part of the space. A gap is provided between the first bypass stopper and the first metal bead of a first outer peripheral seal. The gap separates the first bypass stopper from the first metal bead.

19 Claims, 8 Drawing Sheets

(56) References Cited

U.S. PATENT DOCUMENTS

2019/0198889 A1* 6/2019 Nishida ............... H01M 8/1004
2020/0153000 A1* 5/2020 Stöhr .................. H01M 8/0273

FOREIGN PATENT DOCUMENTS

| CN | 109980240 A | 7/2019 |
| CN | 110710036 A | 1/2020 |
| JP | 2006-120376 A | 5/2006 |
| JP | 5239091 B2 | 7/2013 |
| JP | 2019-114509 A | 7/2019 |
| WO | 2009/043600 A1 | 4/2009 |

OTHER PUBLICATIONS

Office Action dated Oct. 25, 2023, issued in the corresponding Chinese Patent Application No. 202110710539.6 with the English machine translation thereof.

\* cited by examiner

METAL SEPARATOR AND FUEL CELL STACK

CROSS-REFERENCE TO RELATED APPLICATION

This application is based upon and claims the benefit of priority from Japanese Patent Application No. 2020-112919 filed on Jun. 30, 2020, the contents of which are incorporated herein by reference.

BACKGROUND OF THE INVENTION

Field of the Invention

The present invention relates to a metal separator and a fuel cell stack.

Description of the Related Art

A fuel cell stack is formed by stacking power generation cells together. Each of the power generation cells includes a membrane electrode assembly (MEA) and a pair of metal separators disposed on both sides of the MEA. The MEA includes an electrolyte membrane, and electrodes provided on both sides of the electrolyte membrane. A tightening load is applied to the fuel cell stack in a separator thickness direction.

Each of the metal separators includes a separator body in the form of a plate, a reactant gas flow field for allowing a reactant gas to flow from one end to the other end of the separator body along electrodes, and an outer peripheral seal surrounding the reactant gas flow field to prevent leakage of the reactant gas. The outer peripheral seal includes a metal bead formed integrally with the separator body and protruding from the separator body in a manner that the metal bead can be deformed elastically by the compression load. In the state where the metal bead is deformed elastically by the compression load, a top part of the outer peripheral seal is pressed against the resin film (resin frame member) provided in an outer peripheral portion of the MEA.

In this regard, as disclosed in JP 5239091 B2, a protruding bypass stopper (limitation member) may be provided between an end of a reactant gas flow field in the flow field width direction and a metal bead (border wall). The protruding bypass stopper prevents bypassing of a reactant gas. In JP 5239091 B2, the bypass stopper is coupled to the metal bead.

SUMMARY OF THE INVENTION

In the above described conventional technique, since the bypass stopper is coupled to the metal bead, the meal bead cannot be deformed easily by the compression load. Therefore, it may not be possible to apply the desired seal surface pressure to the outer peripheral seal.

The present invention has been made taking such a problem into account, and an object of the present invention is to provide a metal separator and a fuel cell stack in which it is possible to apply the desired seal surface pressure to an outer peripheral seal.

According to an aspect of the present invention, a metal separator is provided. The metal separator is configured to be incorporated into a fuel cell stack in a manner that the metal separator is stacked on a membrane electrode assembly. The membrane electrode assembly includes an electrolyte membrane, and electrodes disposed on both sides of the electrolyte membrane. The metal separator includes a separator body in the form of a plate, and a reactant gas flow field configured to allow a reactant gas to flow from one end to the other end of the separator body along the electrode, and an outer peripheral seal surrounding the reactant gas flow field and configured to prevent leakage of the reactant gas. The outer peripheral seal includes a metal bead formed integrally with the separator body and protruding from the separator body in a manner that the metal bead can be deformed elastically by the compression load, a bypass stopper is provided in a space between an end of the reactant gas flow field in a flow field width direction and the outer peripheral seal. The bypass stopper is configured to prevent bypassing of a reactant gas by blocking part of the space, and a gap is provided between the bypass stopper and the metal bead. The gap is configured to separate the bypass stopper from the metal bead.

According to another aspect of the present invention, a fuel cell stack is provided. The fuel cell stack is formed by stacking a plurality of power generation cells. Each of the power generation cells includes a membrane electrode assembly and a pair of metal separators disposed on both sides of the membrane electrode assembly. The membrane electrode assembly includes an electrolyte membrane, and electrodes disposed on both sides of the electrolyte membrane. A tightening load is applied to the fuel cell stack in a separator thickness direction. At least one of the pair of metal separators comprises the metal separator as described above.

In the present invention, since the entire bypass stopper is spaced from the metal bead, in comparison with the case where the bypass stopper is coupled to the metal bead, it is possible to easily deform the metal bead elastically by the compression load. Thus, it is possible to apply the desired seal surface pressure to the outer peripheral seal.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a fuel cell separator and a fuel cell stack according to the present invention will be described with reference to the accompanying drawings.

Figure 1:
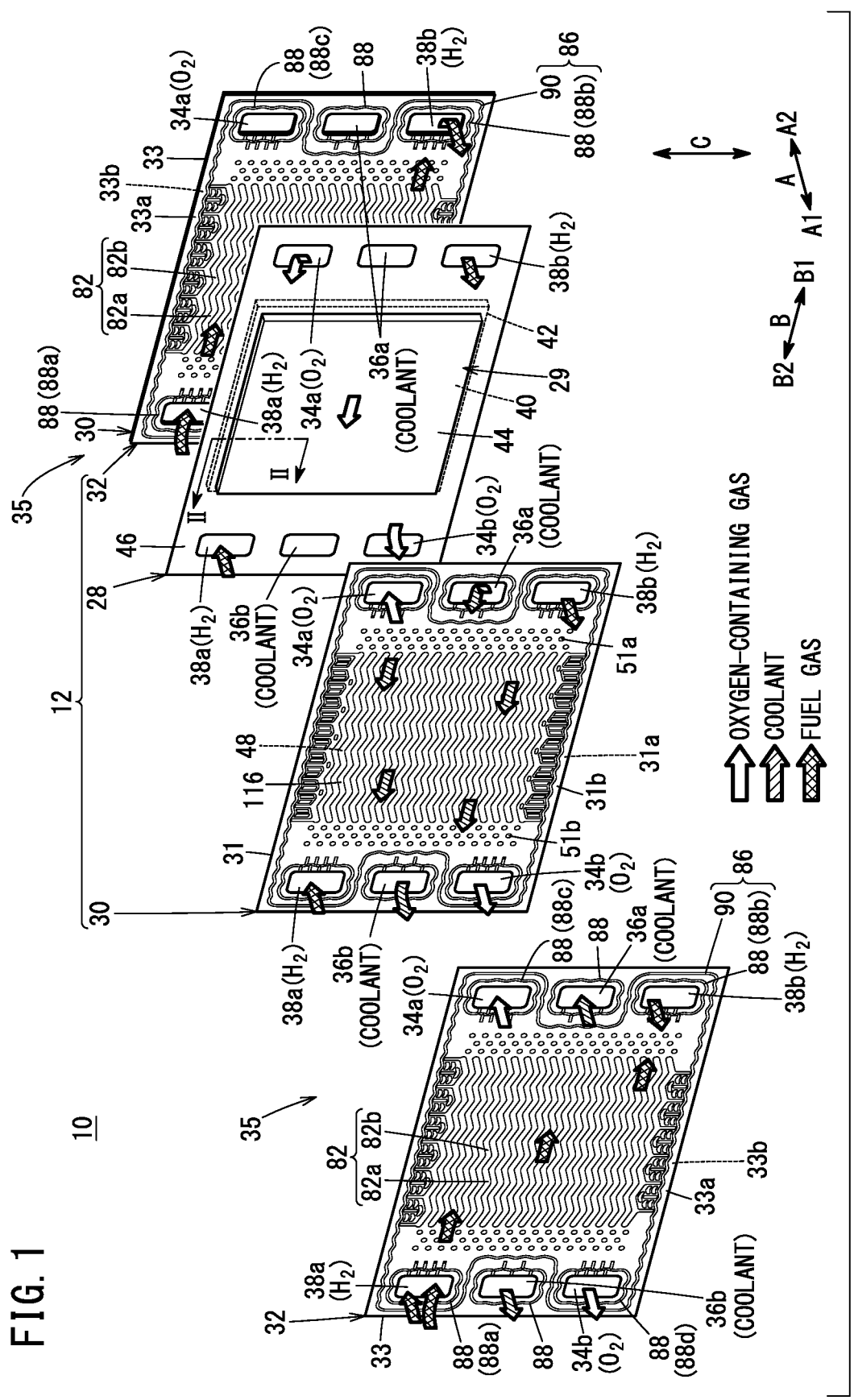
FIG. 1 is an exploded perspective view with partial omission showing a fuel cell stack including a metal separator according to an embodiment of the present invention.

As shown in FIG. 1, a fuel cell stack 10 according to the embodiment of the present invention is formed by stacking a plurality of power generation cells 12 together in a direction indicated by an arrow A. For example, the fuel cell stack 10 is mounted in a fuel cell automobile in a manner that the stacking direction (direction indicated by the arrow A) of a plurality of power generation cells 12 is oriented in a horizontal direction (the vehicle width direction or the vehicle length direction) of the fuel cell automobile. It should be noted that the fuel cell stack 10 may be mounted in the fuel cell automobile in a manner that the stacking direction (direction indicated by the arrow A) of a plurality of power generation cells 12 is oriented in the vertical direction (the vehicle height direction) of the fuel cell automobile. Further, the fuel cell stack 10 may be used in stationary applications.

Figure 2:
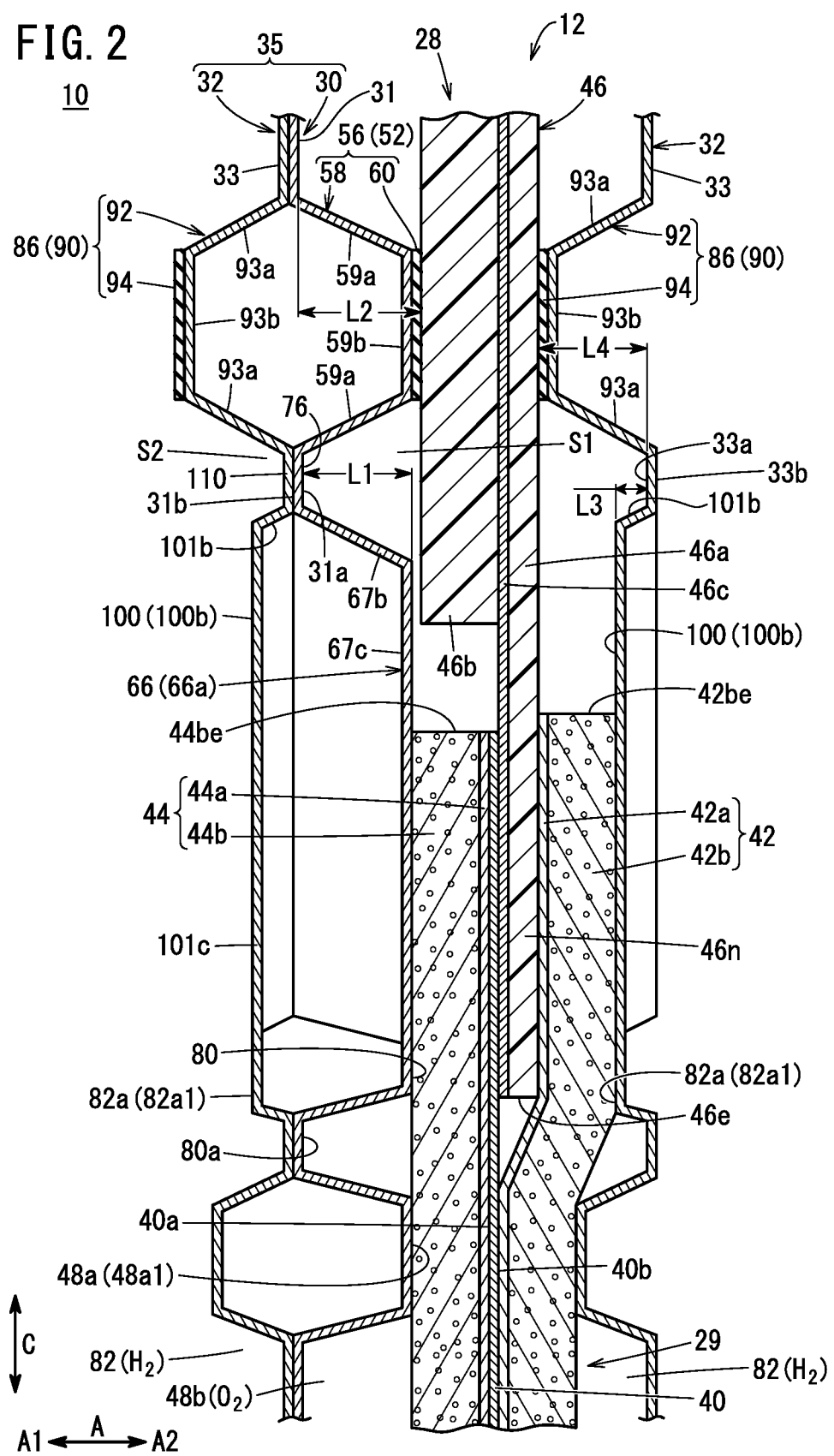
FIG. 2 is a cross sectional view taken along a line II-II in FIGS. 1 and 4.

In FIG. 1, the power generation cell 12 has a laterally elongated rectangular shape. It should be noted that power generation cell 12 may have a longitudinally elongated rectangular shape. As shown in FIGS. 1 and 2, the power generation cell 12 includes a resin frame equipped membrane electrode assembly (hereinafter referred to as the "resin frame equipped MEA 28"), and a first metal separator 30 and a second metal separator 32 provided on both sides of the resin frame equipped MEA 28.

For example, each of the first metal separator 30 and the second metal separator 32 is a steel plate, a stainless steel plate, an aluminum plate, a plated steel plate, or a metal plate having an anti-corrosive surface by surface treatment to have a corrugated shape in cross section and a wavy shape on the surface. An outer peripheral portion of the first metal separator 30 of one of the adjacent power generation cells 12 and an outer peripheral portion of the second metal separator 32 of the other of the adjacent power generation cells 12 are joined together by welding, brazing, crimping, or other jointing method to integrally form a joint separator 35. That is, the fuel cell stack 10 is formed by stacking the resin frame equipped MEAs 28 and the joint separators 35 alternately.

In FIG. 1, at one end of the power generation cell 12 in the long side direction (end in the direction indicated by an arrow B1), an oxygen-containing gas supply passage 34a, a coolant supply passage 36a, and a fuel gas discharge passage 38b are provided. The oxygen-containing gas supply passage 34a, the coolant supply passage 36a, and the fuel gas discharge passage 38b extend through the power generation cell 12 in the stacking direction (direction indicated by the arrow A). The oxygen-containing gas supply passage 34a, the coolant supply passage 36a, and the fuel gas discharge passage 38b are arranged in the direction indicated by the arrow C (vertical direction). For example, the oxygen-containing containing gas is supplied through the oxygen-containing gas supply passage 34a. A coolant such as water is supplied through the coolant supply passage 36a. A fuel gas such as a hydrogen-containing gas is discharged through the fuel gas discharge passage 38b.

At the other end of the power generation cell 12 in the long side direction (end in the direction indicated by an arrow B2), a fuel gas supply passage 38a, a coolant discharge passage 36b, and an oxygen-containing gas discharge passage 34b are provided. The fuel gas supply passage 38a, the coolant discharge passage 36b, and the oxygen-containing gas discharge passage 34b extend through the power generation cell 12 in the stacking direction. The fuel gas supply passage 38a, the coolant discharge passage 36b, and the oxygen-containing gas discharge passage 34b are arranged in the direction indicated by the arrow C. The fuel gas is supplied through the fuel gas supply passage 38a. The coolant is discharged through the coolant discharge passage 36b. The oxygen-containing gas is discharged through the oxygen-containing gas discharge passage 34b. The layout of the oxygen-containing gas supply passage 34a, the oxygen-containing gas discharge passage 34b, the fuel gas supply passage 38a, and the fuel gas discharge passage 38b is not limed to the embodiment of the present invention, and may be determined as necessary depending on the required specification.

As shown in FIG. 2, the resin frame equipped MEA 28 includes a membrane electrode assembly (hereinafter referred to as the "MEA 29"), and a frame shaped resin film 46 (resin frame portion) provided on an outer peripheral portion of the MEA 29.

The MEA 29 includes an electrolyte membrane 40, and an anode 42 and a cathode 44 sandwiching the electrolyte membrane 40. For example, the electrolyte membrane 40 is a solid polymer electrolyte membrane (cation ion exchange membrane). For example, the sold polymer electrolyte membrane is a thin membrane of perfluorosulfonic acid containing water. A fluorine based electrolyte may be used as the electrolyte membrane 40. Alternatively, an HC (hydrocarbon) based electrolyte may be used as the electrolyte membrane 40.

The cathode 44 includes a first electrode catalyst layer 44a joined to one surface 40a of the electrolyte membrane 40, and a first gas diffusion layer 44b stacked on the first electrode catalyst layer 44a. The anode 42 includes a second electrode catalyst layer 42a joined to the other surface 40b of the electrolyte membrane 40, and a second gas diffusion layer 42b stacked on the second electrode catalyst layer 42a.

The first electrode catalyst layer 44a is formed by depositing porous carbon particles uniformly on the surface of the first gas diffusion layer 44b together with ion conductive polymer binder, and platinum alloy is supported on surfaces of the carbon particles. The second electrode catalyst layer 42a is formed by depositing porous carbon particles uniformly on the surface of the second gas diffusion layer 42b together with ion conductive polymer binder, and platinum alloy is supported on surfaces of the carbon particles. Each of the first gas diffusion layer 44b and the second gas diffusion layer 42b comprises a carbon paper, a carbon cloth, or other porous conductive material.

As shown in FIG. 1, at one end of the resin film 46 in the direction indicated by the arrow B1, the oxygen-containing gas supply passage 34a, the coolant supply passage 36a, and the fuel gas discharge passage 38b are provided. At the other end of the resin film 46 in the direction indicated by the arrow B2, the fuel gas supply passage 38a, the coolant discharge passage 36b, and the oxygen-containing gas discharge passage 34b are provided.

As shown in FIG. 2, the resin film 46 includes a first frame shaped sheet 46a and a second frame shaped sheet 46b. An inner peripheral portion of the first frame shaped sheet 46a is joined to an outer peripheral portion of the MEA 29. The second frame shaped sheet 46b is joined to an outer peripheral portion of the first frame shaped sheet 46a. The first frame shaped sheet 46a and the second frame shaped sheet 46b are joined together in the thickness direction by an adhesion layer 46c comprising adhesive. The first frame shaped sheet 46a and the second frame shaped sheet 46b have different thicknesses. The thickness of the first frame shaped sheet 46a is smaller than the thickness of the second frame shaped sheet 46b.

The first frame shaped sheet 46a and the second frame shaped sheet 46b are made of resin material. Examples of materials of the first frame shaped sheet 46a and the second frame shaped sheet 46b include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

The inner peripheral portion 46n of the resin film 46 (inner peripheral portion of the first frame shaped sheet 46a) is disposed between the outer peripheral portion of the anode 42 and the outer peripheral portion of the cathode 44. Specifically, the inner peripheral portion 46n of the resin film 46 is held between the outer peripheral portion of the electrolyte membrane 40 and the outer peripheral portion of the anode 42. The inner peripheral portion 46n of the resin film 46 and the outer peripheral portion of the electrolyte membrane 40 are joined together through the adhesive layer 46c. It should be noted that the inner peripheral portion 46n of the resin film 46 may be held between the electrolyte membrane 40 and the cathode 44.

It should be noted that, instead of using the resin film 46, the electrolyte membrane 40 may be configured to protrude outward. Further, frame shaped films which protrude outward may be provided on both sides of the electrolyte membrane 40.

Figure 3:
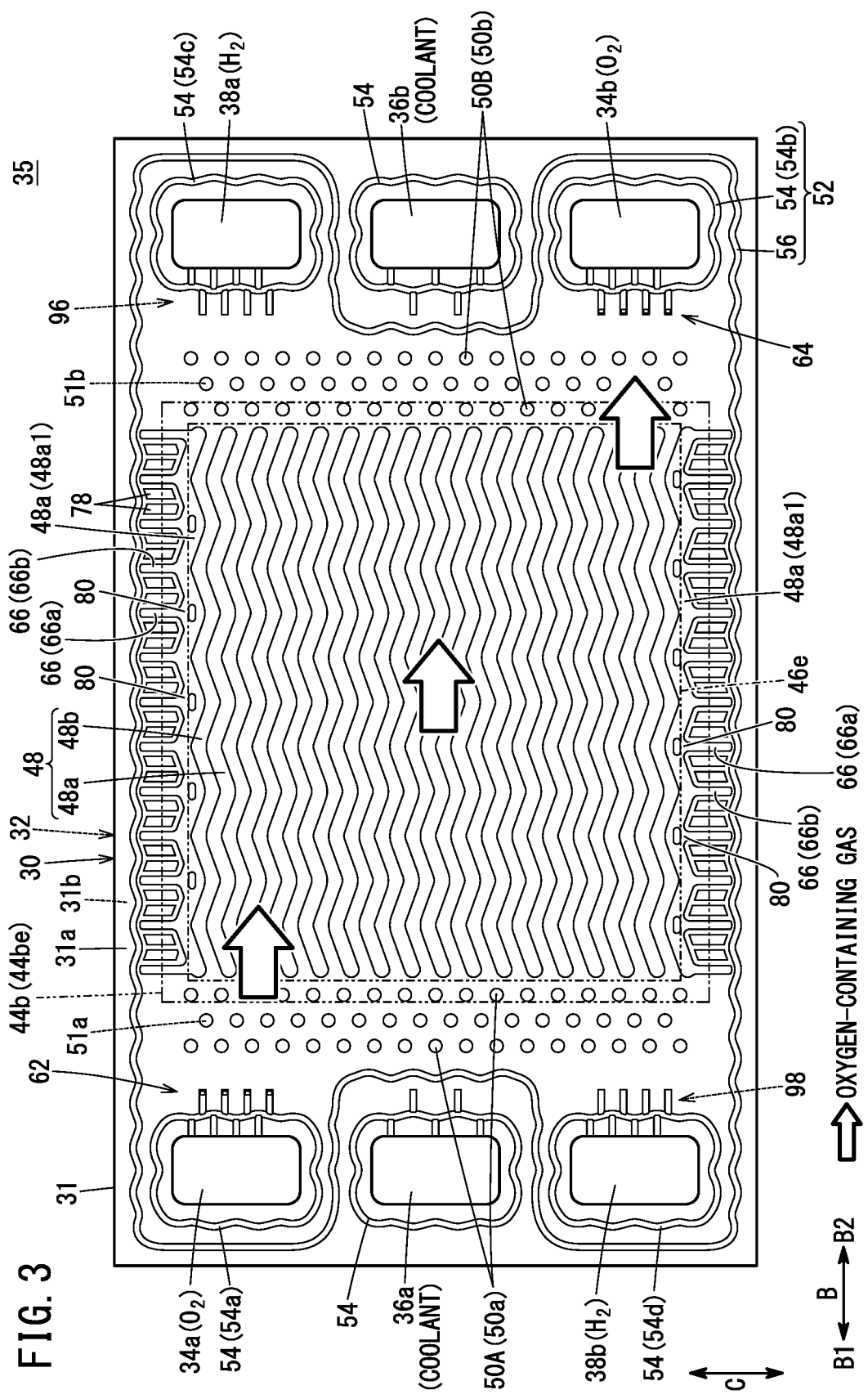
FIG. 3 is a plan view showing a joint separator as viewed from a side where a first metal separator is present.

As shown in FIG. 3, the first metal separator 30 includes a first separator body 31 in the form of a plate. The first separator body 31 has a wavy oxygen-containing gas flow field 48 on its surface facing the resin frame equipped MEA 28 (hereinafter referred to as the "surface 31a"). For example, the oxygen-containing gas flow field 48 extends from one end (end in the direction indicated by the arrow B1) to the other end (end in the direction indicated by the arrow B2) of the first separator body 31.

The oxygen-containing gas flow field 48 is in fluid communication with the oxygen-containing gas supply passage 34a and the oxygen-containing gas discharge passage 34b. The oxygen-containing gas flow field 48 includes a plurality of wavy flow grooves 48b formed between a plurality of wavy ridges 48a extending in the direction indicated by the arrow B. Therefore, in the oxygen-containing gas flow field 48, the plurality of ridges 48a and the plurality of flow grooves 48b are disposed alternately in the flow field width direction (direction indicted by the arrow C). Hereinafter, among the plurality of ridges 48a, the ridges 48a1 positioned at both ends in the flow field width direction will be referred to as the "first end ridges 48a1". The first end ridges 48a1 are disposed on the inner side than the outer end 44be of the first gas diffusion layer 44b. It should be noted that the oxygen-containing gas flow field 48 (the ridges 48a and the flow grooves 48b) may extend straight in the direction indicated by the arrow B.

A first inlet buffer 50A is provided on a surface 31a of the first separator body 31, between the oxygen-containing gas supply passage 34a and the oxygen-containing gas flow field 48. The first inlet buffer 50A includes a plurality of boss arrays each comprising a plurality of bosses 50a arranged in the direction indicated by the arrow C. Further, a first outlet buffer 50B is provided on the surface 31a of the first separator body 31, between the oxygen-containing gas discharge passage 34b and the oxygen-containing gas flow field 48. The first outlet buffer 50B includes a plurality of boss arrays each comprising a plurality of bosses 50b.

As shown in FIGS. 1 and 3, boss arrays are provided on a surface 31b of the first separator body 31 opposite to the oxygen-containing gas flow field 48. The boss arrays comprise a plurality of bosses 51a arranged in the direction indicated by the arrow C, between the boss arrays of the first inlet buffer 50A, and a plurality of bosses 51b arranged in the direction indicated by the arrow C, between the boss arrays of the first outlet buffer 50B. The bosses 51a, 51b form buffers on the surfaces where the coolant flows.

In FIG. 3, a first seal 52 is provided on the surface 31a of the first separator body 31, for preventing leakage of fluid such as reactant gases (e.g., the oxygen-containing gas and the fuel gas) and the coolant. The first seal 52 has a wavy shape as viewed in the separator thickness direction (direction indicated by the arrow A). It should be noted that the first seal 52 may extend straight as viewed in the separator thickness direction.

The first seal 52 includes a plurality of first fluid passage seals 54 provided around the plurality of fluid passages (e.g., the oxygen-containing gas supply passage 34a), respectively, and a first outer peripheral seal 56 provided on the outer peripheral portion of the first separator body 31. The plurality of first fluid passage seals 54 are formed around the oxygen-containing gas supply passage 34a, the oxygen-containing gas discharge passage 34b, the coolant supply passage 36a, the coolant discharge passage 36b, the fuel gas supply passage 38a, and the fuel gas discharge passage 38b, respectively.

Hereinafter, among the plurality of first fluid passage seals 54, the first fluid passage seal 54 around the oxygen-containing gas supply passage 34a will be referred to as the "first fluid passage seal 54a", the first fluid passage seal 54 around the oxygen-containing gas discharge passage 34b will be referred to as the "first fluid passage seal 54b", the first fluid passage 54 around the fuel gas supply passage 38a will be referred to as the "first fluid passage seal 54c", and the first fluid passage seal 54 around the fuel gas discharge passage 38b will be referred to as the "first fluid passage seal 54d".

The first outer peripheral seal 56 is used for preventing leakage of the reactant gas (oxygen-containing gas). The first outer peripheral seal 56 surrounds the oxygen-containing gas flow field 48, the first inlet buffer 50A, the first outlet buffer 50B, and a plurality of first fluid passage seals 54a to 54d.

As shown in FIG. 2, the first seal 52 includes a first metal bead 58 formed integrally with the first separator body 31 by press forming and protruding toward the resin frame equipped MEA 28, and a first resin member 60 provided on the first metal bead 58. The first metal bead 58 has a trapezoidal shape in lateral cross section which is narrowed toward the direction in which the first metal bead 58 protrudes.

The first metal bead 58 includes a pair of first bead side parts 59a disposed to face each other, and a first bead top part 59b coupling the protruding ends of the pair of first bead side parts 59a. The interval between the pair of first bead side parts 59a is narrowed gradually toward the first bead top part 59b. It should be noted that the first bead side parts 59a may extend parallel to each other in the separator thickness direction (direction indicated by the arrow A). That is, the first metal bead 58 may have a rectangular shape in lateral cross section.

The first resin member 60 is an elastic member fixed to a protruding end surface (outer surface of the first bead top part 59b) of the first metal bead 58 by printing or coating. The first resin member 60 may be made of polyester fiber, for example. It should be noted that the first resin member 60 may be dispensed with.

In FIG. 3, a bridge section 62 is provided on the first separator body 31. The bridge section 62 connects the inner side of the first fluid passage seal 54a (side closer to the oxygen-containing gas supply passage 34a) and the outer side of the first fluid passage seal 54a (side closer to the oxygen-containing gas flow field 48). The bridge section 62, which is part of the first fluid passage seal 54a surrounding the oxygen-containing gas supply passage 34a, is provided between the oxygen-containing gas supply passage 34a and the oxygen-containing gas flow field 48. A bridge section 64 is provided on the first separator body 31. The bridge section 64 connects the inner side of the first fluid passage seal 54b (side closer to the oxygen-containing gas discharge passage 34b) and the outer side of the first fluid passage seal 54b (side closer to the oxygen-containing gas flow field 48). The bridge section 64, which is part of the first fluid passage seal 54b surrounding the oxygen-containing gas discharge passage 34b, is provided between the oxygen-containing gas discharge passage 34b and the oxygen-containing gas flow field 48.

Figure 4:
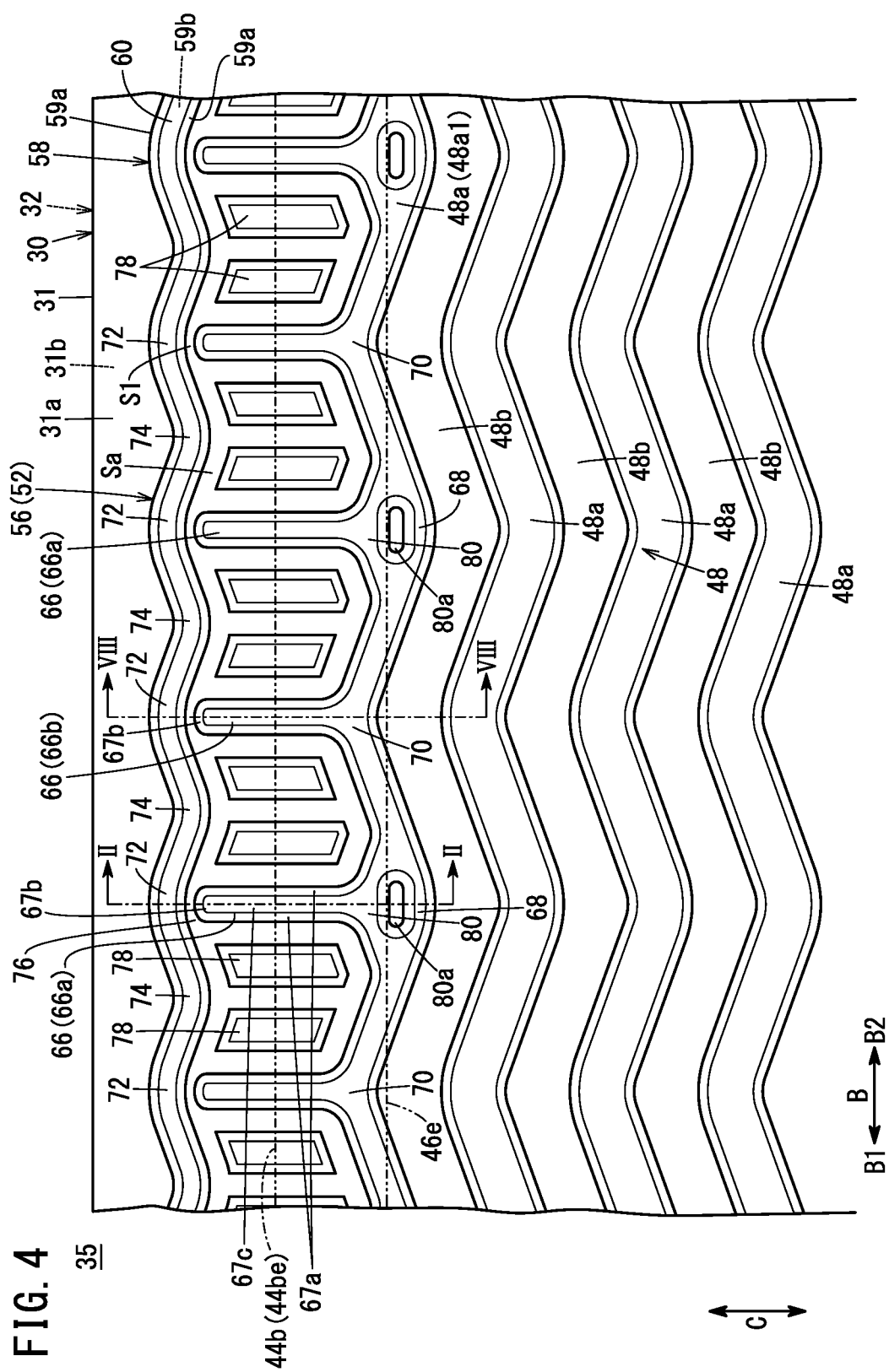
FIG. 4 is an enlarged plan view showing main components of the first metal separator in FIG. 1.

As shown in FIGS. 3 and 4, in the space between the first outer peripheral seal 56 and ends (first end ridges 48a1) of the oxygen-containing gas flow field 48 in the flow field width direction, a plurality of first bypass stoppers 66 are provided. The first bypass stoppers 66 prevent bypassing of the oxygen-containing gas from the oxygen-containing gas supply passage 34a to the oxygen-containing gas discharge passage 34b by blocking part of the space. In the embodiment, the flow field width direction of the oxygen-containing gas flow field 48 is the direction along the short side of the rectangular first metal separator 30 (the direction indicated by the arrow C). The plurality of first bypass stoppers 66 are disposed at intervals in the direction in which the first end ridge 48a1 extends (in the direction indicated by the arrow B). Each of the first bypass stoppers 66 is a narrow protrusion extending in the flow field width direction of the oxygen-containing gas flow field 48 (in the direction indicated by the arrow C).

In FIG. 4, the first end ridge 48a1 includes a first recessed curved section 68 curved away from the first outer peripheral seal 56 in a plan view viewed in the separator thickness direction, and a first protruding curved section 70 curved toward the first outer peripheral seal 56 in a plan view viewed in the separator thickness direction. The first outer peripheral seal 56 includes a first recessed seal section 72 curved away from the first end ridge 48a1, and a first protruding seal section 74 curved toward the first end ridge 48a1.

Hereinafter, among the plurality of first bypass stoppers 66, the first bypass stopper 66 positioned between the first recessed curved section 68 and the first recessed seal section 72 will also be referred to as the "first bypass stopper 66a", and the first bypass stopper 66 positioned between the first protruding curved section 70 and the first recessed seal section 72 will also be referred to as the "first bypass stopper 66b". The first bypass stoppers 66a and the first bypass stoppers 66b are arranged alternately at intervals in the direction in which the first end ridge 48a1 extends (indicated by the arrow B).

One end of each of the first bypass stoppers 66a in the longitudinal direction (length direction) is spaced from the first outer peripheral seal 56, and in this state, faces the first recessed seal section 72. The other end of each of the first bypass stoppers 66a in the longitudinal direction is connected to the first recessed curved section 68 integrally. One end of each of the bypass stoppers 66b is spaced from the first outer peripheral seal 56, and in this state, faces the first recessed seal section 72. The other end of each of the first bypass stoppers 66b in the longitudinal direction is connected to the first protruding curved section 70 integrally.

As shown in FIGS. 2 and 4, each of the first bypass stoppers 66 includes a pair of first side walls 67a disposed to face each other in the direction indicated by the arrow B, a first end wall 67b coupling one ends of the pair of first side walls 67a in the longitudinal direction, and a first top wall 67c provided to connect protruding ends of the pair of first side walls 67a. The first side walls 67a are inclined from the separator thickness direction. The first bypass stopper 66 has a trapezoidal shape in lateral cross section. It should be noted that the first side walls 67a on both sides of the first bypass stopper 66 in the width direction may be in parallel to the separator thickness direction. That is, the first bypass stopper 66 may have a rectangular shape in lateral cross section.

As viewed in the separator thickness direction, the front end of the first end wall 67b facing the first outer peripheral seal 56 has a protruding circular arc shape (see FIG. 4). In FIG. 2, the first end wall 67b is inclined from the separator thickness direction. Stated otherwise, the first end wall 67b is inclined straight toward the side where the first end ridge 48a1 is present, from the first separator body 31 to the first top wall 67c. The surface of the first top wall 67c closer to the resin frame equipped MEA 28 is slightly spaced from the resin film 46. Stated otherwise, a gap (space) is formed between the first top wall 67c and the resin film 46 (second frame shaped sheet 46b).

The distance L1 (height of the first bypass stopper 66) from the surface 31a of the first separator body 31 to the outer surface of the first top wall 67c is smaller than the distance L2 (height of the first outer peripheral seal 56) from the surface 31a of the first separator body 31 to the protruding end surface of the first outer peripheral seal 56 (outer surface of the first resin member 60). That is, the outer surface of the first top wall 67c of the first bypass stopper 66 is positioned closer to the first separator body 31 in comparison with the protruding end surface of the first outer peripheral seal 56 (outer surface of the first resin member 60).

As shown in FIGS. 2 and 4, a gap S1 (space) is formed between one end (first end wall 67b) of each of the first bypass stoppers 66 and the outer peripheral seal 56. That is, the first bypass stopper 66 is positioned in a manner that the entire first bypass stopper 66 is positioned away from the first outer peripheral seal 56 (first metal bead 58). Stated otherwise, the gap S1 is provided between the first bypass stopper 66 and the first metal bead 58 of the first outer peripheral seal 56, for separating the first bypass stopper 66 from the first metal bead 58.

The interval between the first metal bead 58 of the first outer peripheral seal 56 and the first bypass stopper 66 is increased toward the direction in which the first metal bead 58 protrudes. A first coupling wall 76 coupling the root of the first bypass stopper 66 and the root of the first metal bead 58 of the first outer peripheral seal 56 contacts the second separator body 33 of the second metal separator 32 (see FIG. 2).

In FIG. 4, intermediate protrusions 78 supporting an outer peripheral portion of the MEA 29 are provided between the first bypass stopper 66a and the first bypass stopper 66b that are adjacent to each other. The intermediate protrusions 78 protrude toward the resin frame equipped MEA 28. The plurality of intermediate protrusions 78 are disposed between the first bypass stopper 66a and the first bypass stopper 66b that are adjacent to each other.

A gap Sa is provided between the intermediate protrusions 78 and the first metal bead 58 of the first outer peripheral seal 56, for separating the intermediate protrusions 78 from the first metal bead 58. The gap S1 between the first bypass stopper 66 and the first metal bead 58 of the first outer peripheral seal 56 is smaller than the gap Sa between the intermediate protrusion 78 and the first metal bead 58 of the first outer peripheral seal 56.

In FIG. 4, for example, the two intermediate protrusions 78 are arranged at intervals in the direction in which the first end ridge 48a1 extends, between the first bypass stopper 66a and the first bypass stopper 66b that are adjacent to each other. The intermediate protrusion 78 has a shape extending in a direction intersecting with the direction in which the first end ridge 48a1 extends. As viewed in the stacking direction, the intermediate protrusion 78 is disposed at a position overlapped with an outer end 44be of the first gas diffusion layer 44b.

A first support protrusion 80 is provided on the first metal separator 30, between the first recessed curved section 68 of the first end ridge 48a1 and the first bypass stopper 66a. The first support protrusion 80 supports the cathode 44 (first gas diffusion layer 44b). The first support protrusion 80 is formed by press forming, to protrude from the first separator body 31 toward the resin frame equipped MEA 28. In the embodiment of the present invention, the first support protrusion 80 is continuous integrally with the first bypass stopper 66a, and is continuous integrally with the first recessed curved section 68 of the first end ridge 48a1.

As shown in FIG. 2, the first support protrusion 80 supports the cathode 44 (first gas diffusion layer 44b) at a position where the MEA 29 and the resin film 46 are overlapped with each other in the thickness direction. The first support protrusion 80 is provided at a position corresponding to the inner peripheral portion 46n of the frame shaped resin film 46 (position overlapped with the inner peripheral portion 46n of the resin film 46, as viewed in the stacking direction).

As shown in FIG. 4, a recess 80a is provided adjacent to the first support protrusion 80. The recess 80a is recessed away from the cathode 44 (the back side protrudes toward the surface where the coolant flows). The recess 80a is positioned on an imaginary line in which the first bypass stopper 66a extends longitudinally. The recess 80a is provided in correspondence with each of the plurality of first support protrusions 80. That is, a plurality of the recesses 80a are arranged in the direction in which the first end ridges 48a1 extend. As shown in FIG. 2, the front end of the protrusion as the back surface of the recess 80a contacts the second metal separator 32 adjacent to the protrusion.

The numbers, the positions, the shapes, and the sizes of the bypass stoppers 66, the intermediate protrusions 78, and the first support protrusions 80 can be determined as necessary.

Figure 5:
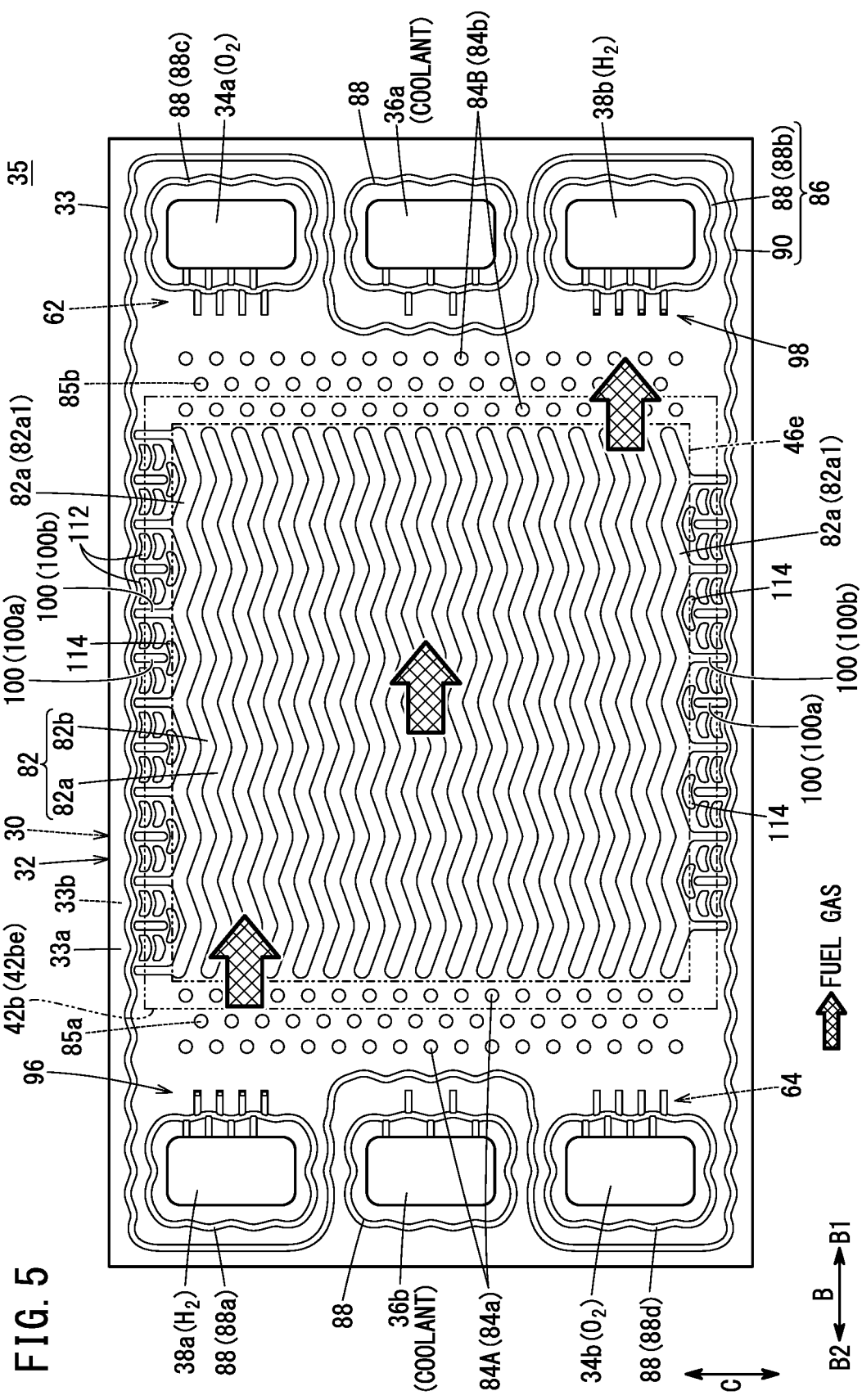
FIG. 5 is a plan view showing a joint separator as viewed from a side where a second metal separator is present.

As shown in FIG. 5, the second metal separator 32 includes a second separator body 33 in the form of a plate. The second separator body 33 has a wavy fuel gas flow field 82 on its surface facing the resin frame equipped MEA 28 (hereinafter referred to as the "surface 33a"). For example, the fuel gas flow field 82 extends from one end (end in the direction indicated by the arrow B1) to the other end (end in the direction indicated by the arrow B2) of the second separator body 33.

The fuel gas flow field 82 is in fluid communication with the fuel gas supply passage 38a and the fuel gas discharge passage 38b. The fuel gas flow field 82 includes a plurality of wavy flow grooves 82b formed between a plurality of wavy ridges 82a extending in the direction indicated by the arrow B. Therefore, in the fuel gas flow field 82, a plurality of ridges 82a and a plurality of flow grooves 82b are disposed alternately in the flow field width direction (direction indicted by the arrow C). Hereinafter, among the plurality of ridges 82a, the ridges 82a1 positioned at both ends in the flow field width direction will be referred to as the "second end ridges 82a1". The second end ridge 82a1 is disposed on the inner side than the outer end 42be of the second gas diffusion layer 42b. It should be noted that the fuel gas flow field 82 (the ridges 82a and the flow grooves 82b) may extend straight in the direction indicated by the arrow B.

A second inlet buffer 84A is provided on the surface 33a of the second separator body 33, between the fuel gas supply passage 38a and the fuel gas flow field 82. The second inlet buffer 84A comprises a plurality of boss arrays each comprising a plurality of bosses 84a arranged in the direction indicated by the arrow C. Further, a second outlet buffer 84B is provided on the surface 33a of the second separator body 33, between the fuel gas discharge passage 38b and the fuel gas flow field 82. The second outlet buffer 84B includes a plurality of boss arrays each comprising a plurality of bosses 84b.

Further, boss arrays are provided on the surface 33b of the second separator body 33 opposite to the fuel gas flow field 82. The boss arrays comprise a plurality of bosses 85a arranged in the direction indicated by the arrow C, between the boss arrays of the second inlet buffer 84A, and a plurality of bosses 85b arranged in the direction indicated by the arrow C, between the boss arrays of the second outlet buffer 84B. The bosses 85a, 85b form buffers on the surface where the coolant flows.

A second seal 86 is provided on the surface 33a of the second separator body 33, for preventing leakage of fluid such as reactant gases (e.g., the oxygen-containing gas and the fuel gas) and the coolant. The second seal 86 has a wavy shape as viewed in the separator thickness direction (direction indicated by the arrow B). It should be noted that the second seal 86 may extend straight as viewed in the separator thickness direction.

The second seal 86 includes a plurality of fluid passage seals 88 provided around the plurality of fluid passages (e.g., the fuel gas supply passage 38a), respectively, and a second outer peripheral seal 90 provided on an outer peripheral portion of the second separator body 33. A plurality of second fluid passage seals 88 are formed around the oxygen-containing gas supply passage 34a, the oxygen-containing gas discharge passage 34b, the fuel gas supply passage 38a, and the fuel gas discharge passage 38b, the coolant supply passage 36a, and the coolant discharge passage 36b, respectively.

Hereinafter, among the plurality of second fluid passage seals 88, the second fluid passage seal 88 around the fuel gas supply passage 38a will be referred to as the "second fluid passage seal 88a", the second fluid passage seal 88 around the fuel gas discharge passage 38b will be referred to as the "second fluid passage seal 88b", the second fluid passage seal 88 around the oxygen-containing gas supply passage 34a will be referred to as the "second fluid passage seal 88c", and the second fluid passage seal 88 around the oxygen-containing gas discharge passage 34b will be referred to as the "second fluid passage seal 88d".

The second outer peripheral seal 90 is used for preventing leakage of the reactant gas (fuel gas). The second outer peripheral seal 90 surrounds the fuel gas flow field 82, the second inlet buffer 84A, the second outlet buffer 84B, and the plurality of second fluid passage seals 88*a* to 88*d*.

As shown in FIG. 2, the second seal 86 includes a second metal bead 92 formed integrally with the second separator body 33 and protruding toward the resin frame equipped MEA 28, and a second resin member 94 provided on the second metal bead 92. The second metal bead 92 has a trapezoidal shape which is narrowed toward the direction in which the second metal bead 92 protrudes.

The second metal bead 92 includes a pair of second bead side parts 93*a* disposed to face each other, and a second bead top part 93*b* coupling the protruding ends of the pair of second bead side parts 93*a*. The interval between the pair of second bead side parts 93*a* is narrowed gradually toward the second bead top part 93*b*. It should be noted that the second bead side part 93*a* may be in parallel to the separator thickness direction (direction indicated by the arrow A). That is, the second metal bead 92 may have a rectangular shape in lateral cross section.

The second resin member 94 is an elastic member fixed to a protruding end surface (outer surface of the second bead top part 93*b*) of the second metal bead 92 by printing or coating. The second resin member 94 may be made of polyester fiber, for example. It should be noted that the second resin member 94 may be dispensed with.

In FIG. 5, a bridge section 96 is provided on the second separator body 33. The bridge section 96 connects the inner side of the second fluid passage seal 88*a* (side closer to the fuel gas supply passage 38*a*) and the outer side of the second fluid passage seal 88*a* (side closer to the fuel gas flow field 82). The bridge section 96, which is part of second fluid passage seal 88*a* surrounding the fuel gas supply passage 38*a*, is provided between the fuel gas supply passage 38*a* and the fuel gas flow field 82. A bridge section 98 is provided on the first separator body 33. The bridge section 98 connects the inner side of the second fluid passage seal 88*b* (side closer to the fuel gas discharge passage 38*b*) and the outer side of the second fluid passage seal 88*b* (side closer to the fuel gas flow field 82). The bridge section 98, which is part of the second fluid passage seal 88*b* surrounding the fuel gas discharge passage 38*b*, is provided between to the fuel gas discharge passage 38*b* and the fuel gas flow field 82.

Figure 6:
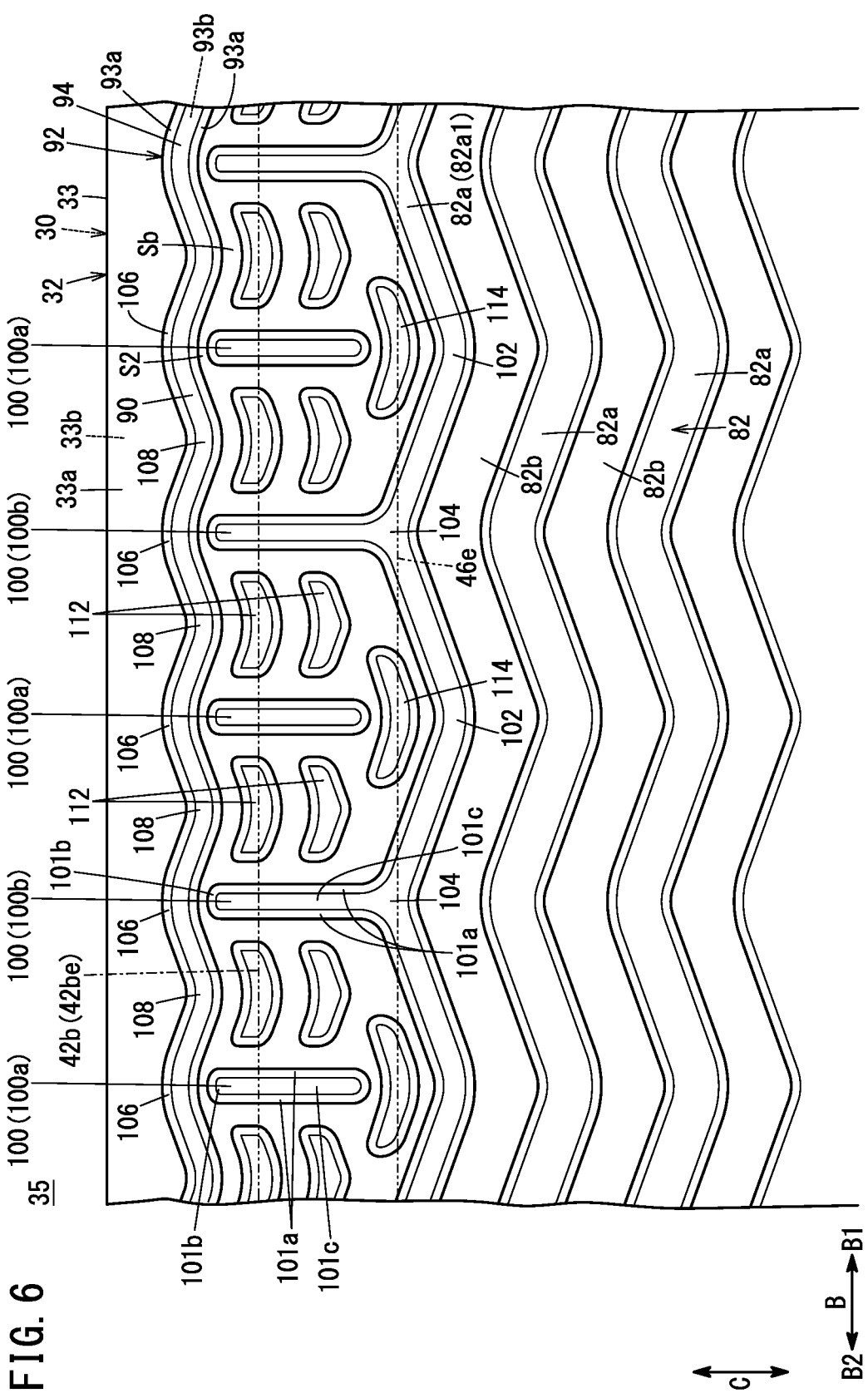
FIG. 6 is an exploded enlarged plan view showing main components of the second metal separator.

As shown in FIGS. 5 and 6, in the space between the second outer peripheral seal 90 and ends (second end ridges 82*a*1) in the flow field width direction of the fuel gas flow field 82, a plurality of second bypass stoppers 100 are provided. The second bypass stoppers 100 prevent bypassing of the fuel gas from the fuel gas supply passage 38*a* to the fuel gas discharge passage 38*b* by blocking part of the space. In the embodiment of the present invention, the flow field width direction of the fuel gas flow field 82 is the direction along the short side of the rectangular second metal separator 32. The plurality of second bypass stoppers 100 are disposed at intervals in the direction in which the second end ridge 82*a*1 extends (in the direction indicated by the arrow B). Each of the second bypass stoppers 100 is a narrow protrusion extending in the flow field width direction of the fuel gas flow field 82 (in the direction indicated by the arrow C).

In FIG. 6, the second end ridge 82*a*1 includes a second recessed curved section 102 curved away from the second outer peripheral seal 90, and a second protruding curved section 104 curved toward the second outer peripheral seal 90. The second outer peripheral seal 90 includes a second recessed seal section 106 curved away from the second end ridge 82*a*1, and a second protruding seal section 108 curved toward the second end ridge 82*a*1.

Hereinafter, among the plurality of second bypass stoppers 100, the second bypass stopper 100 positioned between the second recessed curved section 102 and the second recessed seal section 106 will also be referred to as the "second bypass stopper 100*a*", and the second bypass stopper 100 positioned between the second protruding curved section 104 and the second recessed seal section 106 will also be referred to as the "second bypass stopper 100*b*". The second bypass stoppers 100*a* and the second bypass stoppers 100*b* are arranged alternately at intervals in the direction in which the second end ridge 82*a*1 extends (indicated by the arrow B).

One end of each of the second bypass stoppers 100*a* in the longitudinal direction (length direction) is spaced from the second outer peripheral seal 90, and in this state, faces the second recessed seal section 106. The other end of each of the second bypass stoppers 100*a* in the longitudinal direction is spaced from the second end ridge 82*a*1. One end of each of the second bypass stoppers 100*b* is spaced from the second outer peripheral seal 90, and in this state, faces the second recessed seal 106. The other end of each of the second bypass stoppers 100*b* in the longitudinal direction is connected to the second protruding curved section 104 integrally.

As shown in FIGS. 2 and 6, each of the second bypass stoppers 100 includes a pair of second side walls 101*a* disposed to face each other in the direction indicated by the arrow B, a second end wall 101*b* coupling one ends of the pair of second side walls 101*a* in the longitudinal direction, and a second top wall 101*c* provided at protruding ends of the pair of second side walls 101*a*. The second side wall 101*a* is inclined from the separator thickness direction. The second bypass stopper 100 has a trapezoidal shape in lateral cross section. It should be noted that the second side walls 101*a* on both sides of the second bypass stoppers 100 in the width direction may be in parallel to the separator thickness direction. That is, the second bypass stopper 100 may have a rectangular shape in lateral cross section.

As viewed in the separator thickness direction, the second end wall 101*b* is formed to have a circular arc shape protruding toward the second outer peripheral seal 90 (see FIG. 6). In FIG. 2, the second side wall 101*b* is inclined from the separator thickness direction. Stated otherwise, the second end wall 101*b* is inclined straight toward the side where the second end ridge 82*a*1 is present, from the second separator body 33 to the second top wall 101*c*. The second top wall 101*c* is spaced from the resin film 46. Stated otherwise, a gap (space) is formed between the second top wall 101*c* and the resin film 46 (first frame shaped sheet 46*a*).

The distance L3 (height of the second bypass stopper 100) from the surface 33*a* of the second separator body 33 to the outer surface of the second top wall 101*c* is smaller than the distance L4 (height of the second outer peripheral seal 90) from the surface 33*a* of the second separator body 33 to the protruding end surface of the second outer peripheral seal 90 (outer surface of the second resin member 94). That is, the outer surface of the second top wall 101*c* of the second bypass stopper 100 is positioned closer to the second separator body 33 in comparison with the protruding end surface of the second outer peripheral seal 90 (outer surface of the second resin member 94).

As shown in FIGS. 2 and 6, a gap S2 (space) is formed between one end (second end wall 101*b*) of the second bypass stopper 100 and the second outer peripheral seal 90. That is, the second bypass stopper 100 is positioned in a manner that the entire second bypass stopper 100 is positioned away from the second outer peripheral seal 90 (second metal bead 92). Stated otherwise, the gap S2 is provided between the second bypass stopper 100 and the second metal bead 92 of the second outer peripheral seal 90, for separating the second bypass stopper 100 from the second metal bead 92.

The interval between the second metal bead 92 of the second outer peripheral seal 90 and the second bypass stopper 100 is increased toward the direction in which the second metal bead 92 protrudes. A second coupling wall 110 coupling the root of the second bypass stopper 100 and the root of the second metal bead 92 of the second outer peripheral seal 90 contacts the first separator body 31 (first coupling wall 76) of the first metal separator 30 (see FIG. 2).

In FIG. 6, intermediate protrusions 112 supporting an outer peripheral portion of the MEA 29 are provided between the second bypass stopper 100a and the second bypass stopper 100b that are adjacent to each other. The intermediate protrusions 112 protrude toward the resin frame equipped MEA 28. The plurality of intermediate protrusions 112 are disposed between the second bypass stopper 100a and the second bypass stopper 100b that are adjacent to each other.

A gap Sb is provided between the intermediate protrusion 112 and the second metal bead 92 of the second outer peripheral seal 90, for separating the intermediate protrusion 112 from the second metal bead 92. The gap S2 between the second bypass stopper 100 and the second metal bead 92 of the second outer peripheral seal 90 is smaller than the gap Sb between the intermediate protrusion 112 and the second metal bead 92 of the second outer peripheral seal 90.

The aligning direction of a plurality of intermediate protrusions 112 which are located between the second bypass stopper 100a and the second bypass stopper 100b and that are adjacent to each other, is different from the aligning direction of a plurality of intermediate protrusions 78 (FIG. 4) which are located between the first bypass stopper 66a and the first bypass stopper 66b and that are adjacent to each other. Specifically, in the embodiment of the present invention, the plurality of intermediate protrusions 112 are arranged at intervals along the direction in which the second end ridge 82a1 and the second outer peripheral seal 90 are spaced from each other (in the direction indicated by the arrow C), between the second bypass stopper 100a and the second bypass stopper 100b that are adjacent to each other. As viewed in the stacking direction, the intermediate protrusion 112 is disposed at a position overlapped with the outer peripheral area and the outer end 42be of the second gas diffusion layer 42b.

A second support protrusion 114 is provided on the second metal separator 32, between the second recessed curved section 102 of the second end ridge 82a1 and the second bypass stopper 100a. The second support protrusion 114 supports the anode 42 (second gas diffusion layer 42b). The second support protrusion 114 is formed by press forming, to protrude from the second separator body 33 toward the resin frame equipped MEA 28. As viewed in the separator thickness direction, the second support protrusion 114 is curved in a boomerang shape in a plan view along the curved shape of the second recessed curved section 102. That is, the second support protrusion 114 has a curved shape in a plan view protruding toward the second end ridge 82a1. The length of the second support protrusion 114 along the direction in which the second end ridge 82a1 extends is larger than the width of the second bypass stopper 100a. That is, the length of the second support protrusion 114 is greater than the width of the second bypass stopper 100a, in a direction in which the second end ridge 82a1 extends (in the direction indicated by the arrow B). The second bypass stopper 100a faces the central portion of the second support protrusion 114 in the length direction.

The second support protrusion 114 has a shape which is different from the shape of the first support protrusion 80 (FIG. 4). In the embodiment of the present invention, the second support protrusion 114 is disposed in a manner that the second support protrusion 114 spaced from the second recessed curved section 102 and the second bypass stopper 100a. In this manner, it is possible to improve the rigidity of the second metal separator 32. It should be noted that the second support protrusion 114 may be formed continuously with at least one of the second recessed curved section 102 and the second bypass stopper 100a.

Figure 8:
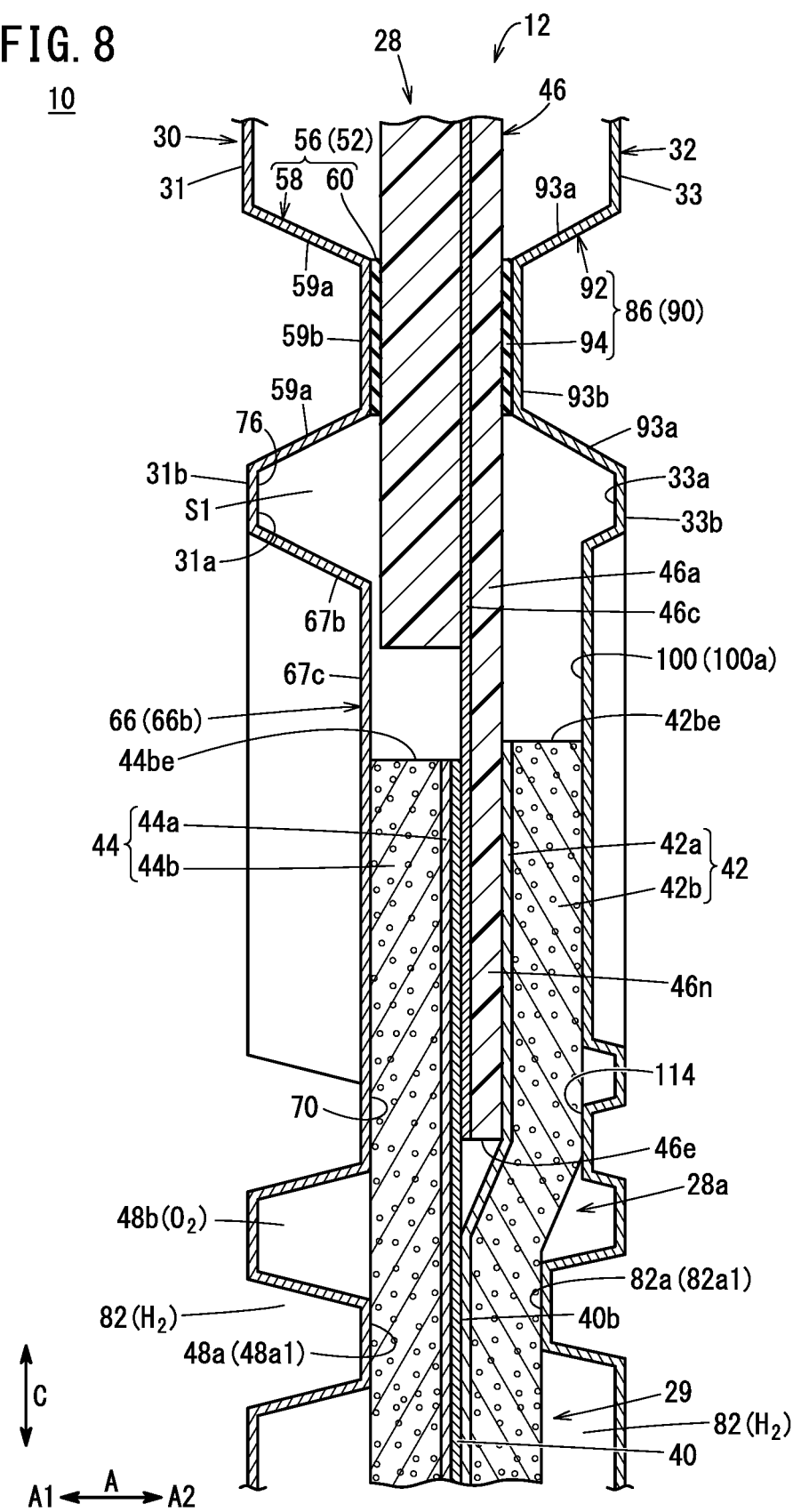
FIG. 8 is a cross sectional view taken along a line VIII-VIII in FIG. 4.

The second support protrusion 114 is provided at a position (position overlapping with an inner end 46e of the frame shaped resin film 46 as viewed from the stacking direction) corresponding to an inner end 46e of the frame shaped resin film 46. As shown in FIG. 8, the second support protrusion 114 supports the anode 42 (second gas diffusion layer 42b) at a position where the outer peripheral portion of the MEA 29 and the inner peripheral portion 46n of the resin film 46 are overlapped with each other.

Figure 7:
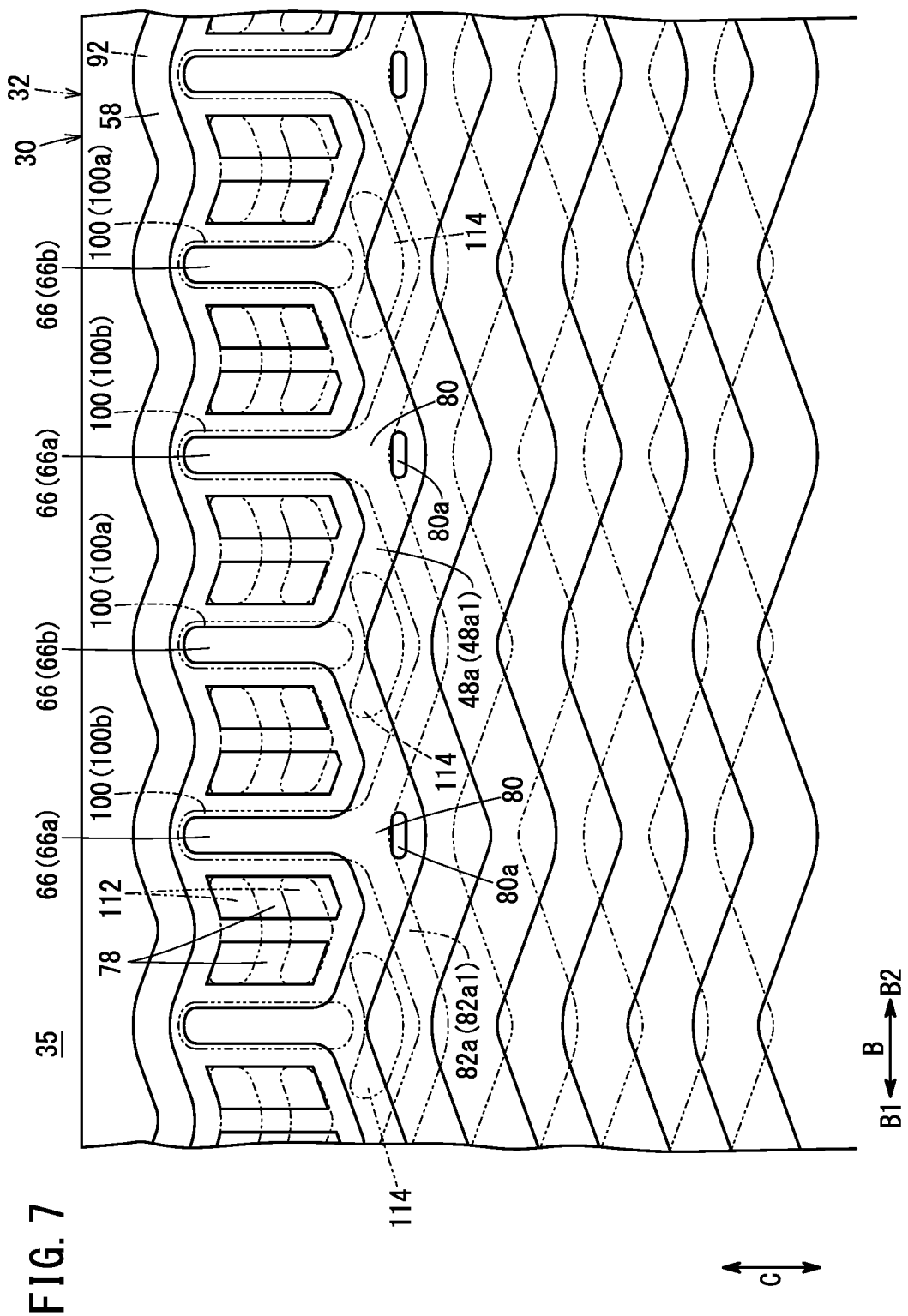
FIG. 7 is a view showing a state where the first metal separator and the second metal separator are stacked together.

As shown in FIG. 7, as viewed in the stacking direction, the ridge 48a of the oxygen-containing gas flow field 48 and the ridge 82a of the fuel gas flow field 82 are formed to have the same wavelength in opposite phases. The first support protrusion 80 of the first metal separator 30 and the second support protrusion 114 of the second metal separator 32 are arranged alternately in the direction in which the ridges 48a, 82a extend.

As shown in FIG. 2, the first support protrusion 80 faces the second end ridge 82a1 of the second metal separator 32 through the MEA 29. Therefore, as shown in FIG. 7, as viewed in the stacking direction, the first support protrusion 80 is overlapped with the second end ridge 82a1 of the second metal separator 32.

As shown in FIG. 8, the second support protrusion 114 faces the first end ridge 48a1 of the first metal separator 30 through the MEA 29. Therefore, as shown in FIG. 7, as viewed in the stacking direction, the second support protrusion 114 is overlapped with the first end ridge 48a1 of the first metal separator 30.

The numbers, the positions, the shapes, and the sizes of the second bypass stoppers 100, the intermediate protrusions 112, and the second support protrusions 114 can be determined as necessary.

As shown in FIG. 1, a coolant flow field 116 is formed between the surface 31b of the first separator body 31 and the surface 33b of the second separator body 33. The coolant flow field 116 is connected to (in fluid communication with) the coolant supply passage 36a and the coolant discharge passage 36b. When the first metal separator 30 and the second metal separator 32 are stacked together, the coolant flow field 116 is formed between the back surface of the first metal separator 30 and the back surface of the second metal separator 32.

Operation of the fuel cell stack 10 having structure as described above will be described below.

Firstly, as shown in FIG. 1, an oxygen-containing gas such as the air is supplied to the oxygen-containing gas supply passage 34a. A fuel gas such as the hydrogen-containing gas is supplied to the fuel gas supply passage 38a. A coolant such as pure water, ethylene glycol, or oil is supplied to the coolant supply passage 36a.

The oxygen-containing gas flows from the oxygen-containing gas supply passage 34a into the oxygen-containing gas flow field 48 formed in the first metal separator 30. Then, as shown in FIG. 3, the oxygen-containing gas moves along the oxygen-containing gas flow field 48 in the direction indicated by the arrow B, and the oxygen-containing gas is supplied to the cathode 44 of the MEA 29.

In the meanwhile, as shown in FIG. 1, the fuel gas is supplied from the fuel gas supply passage 38a into the fuel gas flow field 82 of the second metal separator 32. As shown in FIG. 5, the fuel gas moves along the fuel gas flow field 82 in the direction indicated by the arrow B, and the fuel gas is supplied to the anode 42 of the MEA 29.

Thus, in each of the MEAs 29, the oxygen-containing gas supplied to the cathode 44 and the fuel gas supplied to the anode 42 are consumed in the first electrode catalyst layer 44a and the second electrode catalyst layer 42a to perform power generation.

Then, as shown in FIG. 1, the oxygen-containing gas supplied to the cathode 44 is consumed at the cathode 44, and the remainder flows from the oxygen-containing gas flow field 48 to the oxygen-containing gas discharge passage 34b, and then is discharged along the oxygen-containing gas discharge passage 34b in the direction indicated by the arrow A. Likewise, the fuel gas supplied to the anode 42 is consumed at the anode 42, and the remainder flows from the fuel gas flow field 82 to the fuel gas discharge passage 38b, and then is discharged along the fuel gas discharge passage 38b in the direction indicated by the arrow A.

Further, the coolant supplied to the coolant supply passage 36a is guided into the coolant flow field 116 formed between the first metal separator 30 and the second metal separator 32, and then, the coolant flows through the coolant flow field 116 in the direction indicated by the arrow B. After the coolant cools the MEA 29, the coolant is discharged from the coolant discharge passage 36b.

In this case, the metal separators 30, 32, and the fuel cell stack 10 according to the embodiment of the present invention offers the following advantages.

In the first metal separator 30, the gap S1 is provided between the first bypass stopper 66 and the first metal bead 58 of the first outer peripheral seal 56. The gap S1 separates the first bypass stopper 66 from the first metal bead 58. Therefore, in comparison with the case where the first bypass stopper 66 is coupled to the first metal bead 58, it is possible to easily deform the first metal bead 58 elastically by the compression load. That is, it is possible to reduce the decrease in the seal surface pressure (compression load) of the first outer peripheral seal 56.

Further, the gap S2 is provided between the second bypass stopper 100 and the second metal bead 92 of the second outer peripheral seal 90. The gap S2 separates the second bypass stopper 100 from the second metal bead 92. Therefore, in comparison with the case where the second bypass stopper 100 is coupled to the second metal bead 92, it is possible to easily deform the second metal bead 92 elastically by the compression load. That is, it is possible to reduce the decrease in the seal surface pressure (compression load) of the second outer peripheral seal 90. Therefore, it is possible to apply the desired seal surface pressure to the first outer peripheral seal 56 and the second outer peripheral seal 90.

The first bypass stoppers 66 are formed integrally with the first separator body 31 and protrude from the first separator body 71, and extend in one direction (in the direction indicated by the arrow B). The second bypass stopper 100 are formed integrally with the second separator body 33 and protrude from the second separator body 33, and extend in one direction (in the direction indicated by the arrow B).

In the structure, it is possible to improve the rigidity of the first metal separator 30 by the first bypass stoppers 66, and improve the rigidity of the second metal separator 32 by the second bypass stoppers 100.

The first bypass stopper 66 extends in the flow field width direction of the oxygen-containing gas flow field 48. The second bypass stopper 100 extends in the flow field width direction of the fuel gas flow field 82.

In the structure, it is possible to effectively suppress bypassing of the oxygen-containing gas by the first bypass stopper 66. Further, it is possible to effectively suppress bypassing of fuel gas by the second bypass stopper 100.

The gap S1 between the first metal bead 58 of the first outer peripheral seal 56 and the first bypass stopper 66 is created from the surface 31a of the first separator body 31 to the top part of the first outer peripheral seal 56 (first resin member 60). The gap S2 between the second metal bead 92 of the second outer peripheral seal 90 and the second bypass stopper 100 is created from the surface 33a of the second separator body 33 to the top part of the second outer peripheral seal 90 (second resin member 94).

In the structure, it is possible to make the first metal bead 58 and the second metal bead 92 more deformable by the compression load.

The end of the first bypass stopper 66 opposite to the first separator body 31, i.e., the first top wall 67c, is positioned closer to the first separator body 31 in comparison with the top part of the outer peripheral seal 56. The end of the second bypass stopper 100 opposite to the second separator body 33, i.e., the second top wall 101c, is positioned closer to the second separator body 33 in comparison with the top part of the second outer peripheral seal 90.

In the structure, it is possible to suppress contact of the first top wall 67c of the first bypass stopper 66 and the resin film 46 (second frame shaped sheet 46b). Further, it is possible to suppress contact of the second top wall 101c of the second bypass stopper 100 and the resin film 46 (first frame shaped sheet 46a). In the structure, since the compression load is applied effectively to the first outer peripheral seal 56 and the second outer peripheral seal 90, it is possible to deform the first metal bead 58 and the second metal bead 92 more easily.

The first outer peripheral seal 56 extends in a wavy pattern as viewed in the separator thickness direction, and the first bypass stopper 66 faces the first recessed seal section 72 curved away from the first end ridge 48a1 of the first outer peripheral seal 56. The second outer peripheral seal 90 extends in a wavy pattern as viewed in the separator thickness direction, and the second bypass stopper 100 faces the second recessed seal section 106 curved away from the second end ridge 82a1 of the second outer peripheral seal 90.

In the structure, it is possible to effectively suppress bypassing of the oxygen-containing gas between the first recessed seal section 72 and the first end ridge 48a1 by the first bypass stopper 66. Further, it is possible to effectively suppress bypassing of fuel gas between the second recessed seal section 106 and the second end ridge 82a1 by the second bypass stopper 100.

The plurality of gaps S1 are provided between the plurality of first bypass stoppers 66 and the first metal bead 58 of the first outer peripheral seal 56. The plurality of gaps S2 are provided between the plurality of second bypass stoppers 100 and the second metal bead 92 of the second outer peripheral seal 90.

In the structure, it is possible to apply the desired seal surface pressure to the first outer peripheral seal 56 and the second outer peripheral seal 90, while making it possible to effectively suppress bypassing of the reactant gases (the oxygen-containing gas and the fuel gas).

A plurality of first bypass stoppers 66 are disposed at intervals in the direction in which the oxygen-containing gas flow field 48 extends, and an intermediate protrusion 78 for supporting the MEA 29 (cathode 44) is provided between the first bypass stoppers 66 that are adjacent to each other. The plurality of second bypass stoppers 100 are disposed at intervals in the direction in which the fuel gas flow field 82 extends, and an intermediate protrusion 112 for supporting the MEA 29 (anode 42) is provided between the second bypass stoppers 100 that are adjacent to each other.

In the structure, it is possible to more effectively suppress bypassing of the oxygen-containing gas by the intermediate protrusion 78, and more effectively suppress bypassing of the fuel gas by the intermediate protrusion 112.

The gap S1 between the first metal bead 58 of the first outer peripheral seal 56 and the first bypass stopper 66 is smaller than the gap Sa between the first metal bead 58 and the intermediate protrusion 78. The gap S2 between the second metal bead 92 of the second outer peripheral seal 90 and the second bypass stopper 100 is smaller than the gap Sb between the second metal bead 92 and the intermediate protrusion 112.

In the structure, it is possible to effectively suppress bypassing of the oxygen-containing gas by the first bypass stopper 66 to a greater extent. Further, it is possible to effectively suppress bypassing of fuel gas by the second bypass stopper 100 to a greater extent.

A portion (first coupling wall 76) between the first end ridge 48a1 of the first metal separator 30 and the first metal bead 58 of the first outer peripheral seal 56 contacts the second metal separator 32 adjacent to the first metal separator 30. A portion (second coupling wall 110) between the second end ridge 82a1 of the second metal separator 32 and the second metal bead 92 of the second outer peripheral seal 90 contacts the first metal separator 30 adjacent to the second metal separator 32.

In the structure, it is possible to elastically deform the first metal bead 58 of the first outer peripheral seal 56 and the second metal bead 92 of the second outer peripheral seal 90 by the compression load more effectively.

The present invention is not limited to the above described embodiment. Various modifications can be made without deviating from the gist of the present invention.

The first bypass stopper 66 is not limited to an example where the first bypass stopper 66 is formed integrally with the first separator body 31. The first bypass stopper 66 may be a rubber member provided on the surface 31a of the first separator body 31. This point is also applicable to the second bypass stopper 100.

The above embodiment is summarized as follows:

The embodiment discloses the metal separator (30, 32). The metal separator is configured to be incorporated into the fuel cell stack (10) in a manner that the metal separator is stacked on the membrane electrode assembly (29). The membrane electrode assembly includes the electrolyte membrane (40), and the electrodes (42, 44) disposed on both sides of the electrolyte membrane. When the metal separator is incorporated into the fuel cell stack, a compression load in a separator thickness direction is applied to the metal separator. The metal separator includes the separator body (31, 33) in the form of a plate, and the reactant gas flow field (48, 82) for allowing a reactant gas to flow from one end to the other end of the separator body along the electrode, and the outer peripheral seal (56, 90) surrounding the reactant gas flow field and configured to prevent leakage of the reactant gas. The outer peripheral seal includes the metal bead (58, 92) formed integrally with the separator body and protruding from the separator body in a manner that the metal bead can be deformed elastically by the compression load. The bypass stopper (66, 100) is provided in a space between an end (48a1, 82a1) of the reactant gas flow field in a flow field width direction and the outer peripheral seal. The bypass stopper is configured to prevent bypassing of a reactant gas by blocking part of the space. The gap (S1, S2) is provided between the bypass stopper and the metal bead. The gap is configured to separate the bypass stopper from the metal bead.

In the metal separator, the bypass stopper may be formed integrally with the separator body and may protrude from the separator body, and extend in one direction.

The bypass stopper may extend in a flow field width direction of the reactant gas flow field.

In the metal separator, the gap between the metal bead and the bypass stopper may extend from the surface (31a, 33a) of the separator body to the top part (60, 94) of the outer peripheral seal.

In the metal separator, the end (67c, 101c) of the bypass stopper away from the separator body may be positioned closer to the separator body in comparison with the top part of the outer peripheral seal.

In the metal separator, the outer peripheral seal may extend in a wavy pattern as viewed in the separator thickness direction, and the bypass stopper may be configured to face the recessed seal section (72, 106) curved away from the end of the outer peripheral seal in the flow field width direction.

A plurality of the bypass stoppers may be arranged at intervals in a direction in which the reactant gas flow field extends, and a plurality of the gaps may be provided between the bypass stoppers and the metal bead.

In the metal separator, a plurality of the bypass stoppers may be arranged at intervals in a direction in which the reactant gas flow field extends, and the intermediate protrusion (78, 112) configured to support the membrane electrode assembly may be provided between the bypass stoppers that are adjacent to each other.

The gap between the second metal bead and the bypass stopper may be smaller than the gap (Sa, Sb) between the metal bead and the intermediate protrusion.

The above embodiment discloses the fuel cell stack formed by stacking the plurality of power generation cells (12). Each of the power generation cells includes the membrane electrode assembly and the pair of metal separators disposed on both sides of the membrane electrode assembly. The membrane electrode assembly includes the electrolyte membrane, and the electrodes disposed on both sides of the electrolyte membrane. A tightening load is applied to the fuel cell stack in a separator thickness direction. At least one of the pair of metal separators is the metal separator as described above.

In the fuel cell stack, a portion (76, 110) of the metal separator between an end of the metal separator in the flow field width direction and the metal bead may be configured to contact another metal separator adjacent to the metal separator.

What is claimed is:

1. A metal separator configured to be incorporated into a fuel cell stack in a manner that the metal separator is stacked on a membrane electrode assembly, the membrane electrode assembly including an electrolyte membrane, and electrodes disposed on both sides of the electrolyte membrane,
wherein a compression load in a separator thickness direction is applied to the metal separator incorporated into the fuel cell stack;
the metal separator comprises:
a separator body in a form of a plate; and
a reactant gas flow field configured to allow a reactant gas to flow from one end to another end of the separator body along the electrode; and
an outer peripheral seal surrounding the reactant gas flow field and configured to prevent leakage of the reactant gas,
and wherein the outer peripheral seal includes a metal bead formed integrally with the separator body and protruding from the separator body in a manner that the metal bead is deformed elastically by the compression load;
a bypass stopper is provided in a space between an end of the reactant gas flow field in a flow field width direction and the outer peripheral seal, the bypass stopper being configured to prevent bypassing of the reactant gas by blocking part of the space; and
a gap is provided by a coupling wall of the separator body between the bypass stopper and the metal bead, the coupling wall coupling a root of the bypass stopper protruding from the separator body in the separator thickness direction and a root of the metal bead protruding from the separator body in the separator thickness direction, the gap being configured to completely separate the bypass stopper from the metal bead.

2. The metal separator according to claim 1, wherein the bypass stopper is formed integrally with the separator body and protrudes from the separator body, and extends in one direction.

3. The metal separator according to claim 2, wherein the bypass stopper extends in the flow field width direction of the reactant gas flow field.

4. The metal separator according to claim 1, wherein the gap between the metal bead and the bypass stopper extends from a surface of the separator body to a top part of the outer peripheral seal.

5. The metal separator according to claim 1, wherein an end of the bypass stopper away from the separator body is positioned closer to the separator body in comparison with a top part of the outer peripheral seal.

6. The metal separator according to claim 1, wherein the outer peripheral seal extends in a wavy pattern as viewed in the separator thickness direction; and
the bypass stopper is configured to face a recessed seal section of the outer peripheral seal, the recessed seal section being curved away from the end of the reactant gas flow field in the flow field width direction.

7. The metal separator according to claim 1, wherein a plurality of the bypass stoppers are arranged at intervals in a direction in which the reactant gas flow field extends; and
a plurality of the gaps are provided between the bypass stoppers and the metal bead.

8. The metal separator according to claim 7, wherein a plurality of the bypass stoppers are arranged at intervals in a direction in which the reactant gas flow field extends; and
an intermediate protrusion configured to support the membrane electrode assembly is provided between the bypass stoppers that are adjacent to each other.

9. The metal separator according to claim 8, wherein the gap between the metal bead and the bypass stopper is smaller than a gap between the metal bead and the intermediate protrusion.

10. A fuel cell stack formed by stacking a plurality of power generation cells, the power generation cells each comprising a membrane electrode assembly and a pair of metal separators disposed on both sides of the membrane electrode assembly, the membrane electrode assembly including an electrolyte membrane, and electrodes disposed on both sides of the electrolyte membrane, a load being applied to the fuel cell stack in a separator thickness direction,
wherein at least one of the pair of metal separators comprises:
a separator body in the form of a plate; and
a reactant gas flow field configured to allow a reactant gas to flow from one end to another end of the separator body along the electrode; and
an outer peripheral seal surrounding the reactant gas flow field and configured to prevent leakage of the reactant gas,
and wherein the outer peripheral seal includes a metal bead formed integrally with the separator body and protruding from the separator body in a manner that the metal bead is deformed elastically by the load;
a bypass stopper is provided in a space between an end of the reactant gas flow field in a flow field width direction of the reactant gas flow field and the outer peripheral seal, the bypass stopper being configured to prevent bypassing of the reactant gas by blocking part of the space; and
a gap is provided by a coupling wall of the separator body between the bypass stopper and the metal bead, the coupling wall coupling a root of the bypass stopper protruding from the separator body in the separator thickness direction and a root of the metal bead protruding from the separator body in the separator thickness direction, the gap being configured to completely separate the bypass stopper from the metal bead.

11. The fuel cell stack according to claim 10, wherein the bypass stopper is formed integrally with the separator body and protrudes from the separator body, and extends in one direction.

12. The fuel cell stack according to claim 11, wherein the bypass stopper extends in the flow field width direction of the reactant gas flow field.

13. The fuel cell stack according to claim 10, wherein the gap between the metal bead and the bypass stopper extends from a surface of the separator body to a top part of the outer peripheral seal.

14. The fuel cell stack according to claim 10, wherein an end of the bypass stopper away from the separator body is positioned closer to the separator body in comparison with a top part of the outer peripheral seal.

15. The fuel cell stack according to claim 10, wherein the outer peripheral seal extends in a wavy pattern as viewed in the separator thickness direction; and
the bypass stopper is configured to face a recessed seal section of the outer peripheral seal, the recessed seal section being curved away from the end of the reactant gas flow field in the flow field width direction.

16. The fuel cell stack according to claim 10, wherein a plurality of the bypass stoppers are arranged at intervals in a direction in which the reactant gas flow field extends; and
a plurality of the gaps are provided between the bypass stoppers and the metal bead.

17. The fuel cell stack according to claim 16, wherein the plurality of the bypass stoppers are arranged at intervals in a direction in which the reactant gas flow field extends; and
an intermediate protrusion configured to support the membrane electrode assembly is provided between the bypass stoppers that are adjacent to each other.

18. The fuel cell stack according to claim 17, wherein the gap between the metal bead and the bypass stopper is smaller than a gap between the metal bead and the intermediate protrusion.

19. The fuel cell stack according to claim 10, wherein the metal separator is configured to contact another metal separator adjacent to the metal separator at a portion between the metal bead and a position facing the end of the reactant gas flow field in the flow field width direction.

\* \* \* \* \*